United States Patent [19]

Ernst et al.

[11] Patent Number: 4,907,727

[45] Date of Patent: Mar. 13, 1990

[54] DISPENSING DEVICE HAVING IMPROVED PLUNGER ASSEMBLIES

[75] Inventors: Richard J. Ernst; Sigismund Paul, both of Palatine, Ill.

[73] Assignee: Illinois Tool Works, Inc., Chicago, Ill.

[21] Appl. No.: 264,802

[22] Filed: Oct. 31, 1988

[51] Int. Cl.[4] ..................... B67D 47/02; B67D 49/00; G01F 11/00

[52] U.S. Cl. ................................ 222/386.5; 222/325; 222/137; 222/145

[58] Field of Search ............... 222/137, 145, 325, 206, 222/386, 386.5

[56] References Cited

U.S. PATENT DOCUMENTS 2,902,190 9/1959 Hosler ............................ 222/386.5

3,029,985 4/1962 Krueger et al. ............ 222/386.5 X 3,197,067 7/1965 Rataczak ........................ 222/386 X 3,201,003 8/1965 Wark et al. ........................ 222/206

3,987,941 10/1976 Blessing ............................ 222/386

4,323,177 4/1982 Nielsen ............................... 222/386

*Primary Examiner*—Kevin P. Shaver

*Assistant Examiner*—Mona Beegle

*Attorney, Agent, or Firm*—Schwartz & Weinrieb

[57] ABSTRACT

A hand-held dispenser for dispensing two fluid components of an adhesive polymer through a nozzle and into openings defined within wall structures so as to provide a high strength hold upon metal anchors subsequently inserted into the openings. The dispenser includes an improved plunger assembly for efficiently expelling the fluids from the respective chambers into the nozzle. The improved plunger assembly includes a compression pad mounted on the end of a piston. The compression pad and piston are enclosed by a dome shaped cap which creates an air chamber in between to exert pressure on the compression pad when dispensing to deform the pad to create a seal between the plunger assembly and the cylinder in which it is housed.

8 Claims, 1 Drawing Sheet

DISPENSING DEVICE HAVING IMPROVED PLUNGER ASSEMBLIES

CROSS-REFERENCE TO RELATED APPLICATIONS

In application Ser. No. 113,491 filed on Oct. 28, 1987, and entitled "Dispensing Device For Multiple Components," there is disclosed a dispensing device for multiple components which includes two chambers, one for holding a resin and another for holding a hardener. Each chamber has an exit port formed within a neck which contains passageways leading to each of the chambers. The neck is equipped with external threads which mate with internal threads formed upon a nozzle adjusting nut. A nozzle, which is carried by means of the nut, can be moved from an open position to a closed position in which a portion of the nozzle's base closes the ports. A divider or tab projects from the neck at a location near and between the ports, and the nozzle has a slot so as to receive the divider. The divider functions to prevent mixing of the components until well after they exit the ports.

In application Ser. No. 155,447 filed on Feb. 12, 1988, and entitled "Adjustable Dispensing Tool," there is described and shown a tool for use in dispensing fluids, such as liquid two-part epoxies. The tool includes a frame for carrying a cartridge containing a fluid, a push rod for extending into the cartridge, a canted nut surrounding the push rod for gripping the frame along its length, and a manually operable lever for engaging the canted nut at a predetermined distance from the push rod. The lever is adjustable along its axis so as to vary the predetermined distance so that the mechanical advantage provided by means of the lever may be changed to accommodate fluids of different viscosities.

Application Ser. Nos. 113,491 and 155,447 are both assigned to the same assignee as the present invention and are hereby incorporated by reference.

BACKGROUND OF THE INVENTION

1. Field of the Invention

This invention relates generally to dispensing tools for dispensing multiple component adhesive mixtures such as those used to bond a metal anchor within solid masonry. More particularly, it relates to a dispensing device which includes improved pistons constructed to uniquely interact with an end cap of a cartridge chamber of the dispenser so as to effectively maintain a sealing relationship with the chamber as the mixture is dispensed.

2. Description of the Prior Art

For the dispensing of viscous fluids, such as two-part epoxy components and the like, the prior art includes dispensing devices which consist of a frame for holding a cartridge assembly having two separate cylindrically-shaped chambers, a dispensing nozzle attached to one end of the cartridge assembly, and a combination cartridge end seal and plunger movably disposed within each of the two chambers. A pair of pistons and corresponding parallel piston rods are carried by means of the frame. A third push rod, disposed parallel to the piston rods, is attached to the piston rods at one end by means of a connecting plate. Axial forces applied to the push rod are transferred to the piston rods through means of the connecting plate. As the respective piston rods and pistons are moved forward into the corresponding cartridge chambers and towards the nozzle, the pistons make contact with the cartridge plungers which, in turn, force the viscous fluids of the cartridge assembly out of the nozzle.

As is generally well known, considerable force is required, dependent upon the viscosity of the fluids being dispensed, for ejecting the fluids out of the cartridge assembly. Accordingly, high pressure is exerted by means of the fluids upon the respective pistons and also upon the cartridge chamber walls. Due to this pressure acting upon the cartridge chamber walls, the chambers tend to expand radially so that a certain amount of radial play develops between the pistons and the corresponding chambers. Such radial play tends to cause a loss of sufficient sealing and thus a portion of the fluids being dispensed can escape out of the rear end of the chambers. Prior to the present invention, no satisfactory piston for use with a cartridge plunger disposed within a cartridge has been available which operates to provide sufficient sealing under high pressure conditions.

A state of the art search directed toward the subject matter of this application was conducted in the U.S. Patent and Trademark Office and revealed the following patents: U.S. Pat. Nos. 3,029,985; 3,250,443; 3,493,147; 4,432,473; 4,645,093; and 4,678,107. However, none of the prior art uncovered in the search disclosed a dispensing device for multiple adhesive mixtures having plunger assemblies like that of the present invention which produces a sufficient sealing effect under high pressure dispensing conditions.

OBJECTS OF THE INVENTION

Accordingly, it is a general object of the present invention to provide a dispensing device which operates effectively when dispensing fluidic material of high viscosity by overcoming the high pressures created when dispensing such material.

It is an object of the present invention to provide a dispensing device for dispensing viscous fluids without leakage of the fluids past the plunger assembly thereby insuring that all of the fluids are dispensed from the dispensing device into the desired area.

It is another object of the present invention to provide an improved dispenser for highly viscous adhesive fluids which permits the fluid cartridge to be emptied in less time than with dispensers of conventional plunger design.

SUMMARY OF THE INVENTION

In accordance with these aims and objectives, the present invention provides a dispensing device for dispensing multiple fluid components which includes a frame for holding a cartridge assembly having two separate cylindrically-shaped chambers, a dispensing nozzle disposed at a forward end of the cartridge assembly for mixing and discharging the fluids received from the chambers, a combination end cap and plunger disposed within each of the chambers adjacent to the fluid to be dispensed, and a pair of pistons slidably mounted upon the frame. The invention includes a unique interrelationship between the end cap of each cartridge chamber and the respective piston, as will be described.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several views, wherein.

DESCRIPTION OF THE PREFERRED EMBODIMENT

Figure 1:
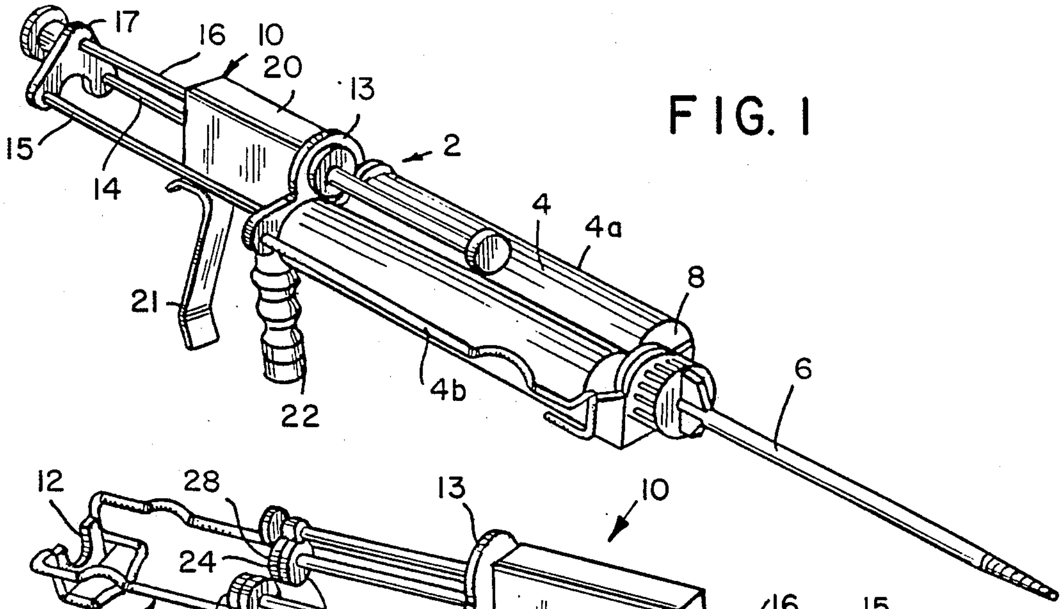
FIG. 1 is a perspective view of an adhesive injection system constructed in accordance with the principles of the present invention.

Referring now in detail to the drawings, there is shown in FIG. 1 an injection system 2, constructed in accordance with the principles of the present invention, for dispensing multiple viscous fluids, such as, for example, two-part epoxy components. The injection system is comprised of a dispensing device 10, a cartridge assembly 4 having two separate cylindrically-shaped chambers *4a*, *4b*, and a mixing and dispensing nozzle 6. One of the cartridge chambers is used, for instance, to hold a resin to be dispensed from the nozzle and the other one is used to hold, for instance, a hardener. The nozzle 6 is disposed at forward ends 8 of the chambers *4a*, *4b* for mixing and dispensing the fluids received from the chambers. In a practical embodiment the resin and hardener combine to form an epoxy polymer designed to achieve high strength anchoring of metal anchors within building structures.

Figure 2:
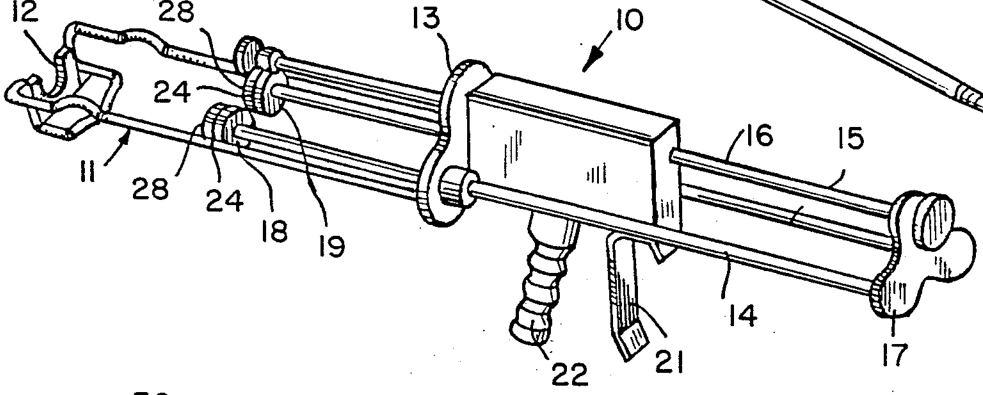
FIG. 2 is a perspective view of the dispensing device of the present invention shown with the cartridge assembly removed.

In FIG. 2, the dispensing device 10 is shown with the cartridge assembly 4 and the mixing nozzle 6 removed. The dispensing device 10 includes a frame 11 for carrying the cartridge assembly 4. The frame 11 has a yoke 12 disposed at its one end and a base plate 13 disposed at its other end. A pair of piston rods 14 and 15, and a push rod 16 project through the base plate 13. These three rods 14, 15 and 16 are joined at one end by means of a connecting plate 17. A rod actuating housing 20 is mounted upon the base plate 13. A rear handle 21 and a trigger 22 extend from the lower side of the housing 20. The internal components of the housing 20 and the trigger 22 are fully described and illustrated within the previously-mentioned application Ser. No. 155,447 which has been incorporated herein by reference.

Pistons 18 and 19 are fixed to the ends of the piston rods 14 and 15, respectively. The pistons 18 and 19 may be formed of any desired material such as, for example, steel and the like. Each of the pistons has a cylindrically-shaped configuration and has a front flat face 24. A cylindrical pad or disc 28 is secured to the front face 24 of each piston. Each of the discs 28 has a diameter substantially equal to the diameter of the respective pistons 18 and 19. The axial thickness of the discs 28 is approximately one-third to one-fourth of the thickness of the pistons. The discs 28 are preferably made of a closed-cell synthetic rubber having a hardness of 60 durometer so as to permit a limited amount of deformability and a sealing function, as will be presently described.

Figure 3:
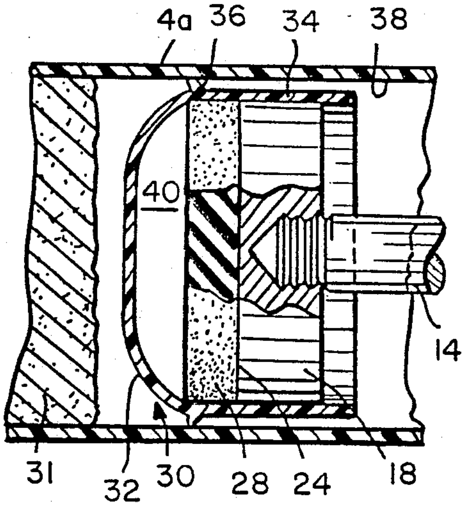
FIG. 3 is an enlarged fragmentary central sectional view, showing the unique plunger assembly of the invention disposed within the cartridge chamber prior to dispensing fluid from the chamber.

As shown in FIG. 3, a combined end cap and plunger 30 is disposed within the chamber *4a* and opposite the front end 8 (FIG. 1) and adjacent to the fluid 31. The end cap/plunger 30 includes a dome-shaped portion 32 and a hollow cylindrically-shaped body or tubular portion 34 formed integrally therewith. Adjacent the juncture of the body portion 34 and dome portion 32 is an annular lip 36, which provides a fluid-tight seal between the plunger 30 and the inner sidewall 38 of the cartridge chamber *4a*.

The end cap/plunger 30 is typically formed of a plastic material such as, for example, polyethylene. The flexible nature of the plastic material permits radial expansion of the body portion 34 near the sealing lip 36 so as to sealingly engage the inner sidewall 38 of the cartridge chamber *4a*.

Referring still to FIG. 3, it will be seen that the piston 18 and attached disc 28 are received within the body 34 of the end cap/plunger 30. The disc 28 engages the member 30 near the juncture of the body 34 and dome 32 generally radially within the sealing lip 36. The disc 28 engages the member 30 so as to define an air chamber 40 between the disc and the dome 32.

Figure 4:
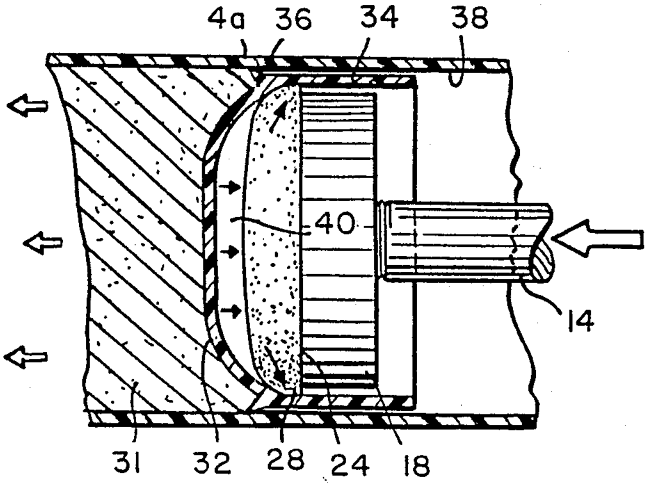
FIG. 4 is an enlarged fragmentary central sectional view, similar to FIG. 3, showing the plunger assembly pressing against the fluid within the cartridge chamber during the dispensing step.

The operation of the plunger assembly of the present invention is best understood by reference to FIG. 4. When the piston rod 14 is moved to the left, the dome portion 32 engages the adhesive fluid 31 and forces are transmitted uniformly through the air chamber 40 onto the front of the disc 28. It will be understood that the disc 28 sealingly engages the member 30 so as to prevent the escape of air from the chamber 40. The disc 28 reacts to the applied forces by expanding radially into tightened engagement with the body or tubular portion 34 of the end cap/plunger 30. This presses the sealing lip 36 into sealing engagement with the chamber walls so as to prevent leakage of fluid past the seal. Accordingly, all of the fluid is efficiently dispensed from the chamber into the dispenser nozzle 6.

Upon completion of the dispensing step, the pistons 18 and 19 are withdrawn from the cartridge chambers and the cartridge (along with the end cap/plunger 30) is removed and discarded. A new cartridge is installed as shown in FIG. 1.

From the foregoing detailed description, it can thus be seen that the present invention provides a dispensing tool which includes a unique plunger assembly so as to effect sufficient sealing under high pressure dispensing conditions. The entry of the piston into the end cap/plunger provides a sealed air chamber across which the forces are uniformly applied to the pad disposed upon the piston. These forces are translated into radial expansion of the pad so as to maintain the sealing engagement with the fluid chamber throughout the entire dispensing stroke of the pistons.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt the teachings of the invention to a particular situation or material without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A plunger assembly for a fluid dispenser having a frame, a cartridge containing fluids to be dispensed, and a nozzle from which said fluids to be dispensed are dispensed, said plunger assembly comprising:

an end cap disposed within said cartridge adjacent to said fluid to be dispensed, and including a generally cylindrical body portion and a dome portion projecting forwardly from said body portion, and further including an annular sealing lip disposed near the juncture of said body and dome portions of said end cap for sealingly engaging the inner wall of said cartridge; and a piston assembly slideably mounted upon said dispenser frame for coaction with said end cap, and including a piston having a front face of a predetermined diametrical extent to which is integrally secured a compressible pad of elastomeric material having a diametrical extent, under non-compressed conditions, which is substantially equal to said diametrical extent of said piston face so as to permit said piston and said compressible pad to be inserted within said body portion of said end cap, said pad being positioned so as to engage said end cap proximate to said juncture of said body and dome portions of said end cap whereby an air chamber is sealingly defined between a front face of said pad and said dome portion of said end cap such that movement of said plunger assembly against said fluid to be dispensed transmits forces against said dome portion of said end cap and through said air chamber onto said front face of said elastomeric compressible pad causing said elastomeric compressible pad to be axially compressed and radially expanded beyond said predetermined diameter of said piston so as to prevent the escape of air out of said air chamber between said body portion of said end cap and said piston and to force said sealing lip into sealing engagement with said cartridge wall.

2. The subject matter of claim 1, wherein the body portion, dome portion and sealing lip of said end cap are formed as an integral unit.

3. The plunger assembly as set forth in claim 2, wherein:

said end cap is fabricated from polyethylene.

4. The plunger assembly as set forth in claim 1, wherein:

said pad comprises closed-cell synthetic rubber.

5. A plunger assembly for use in dispensing devices for dispensing a viscous fluid from a cartridge, comprising:

an end cap disposed within said cartridge and having a tubular portion and a dome-shaped portion closing one end of said tubular portion, wherein said dome-shaped portion engages said fluid to be dispensed from said cartridge, and wherein further, said end cap includes a sealing lip disposed about its outer periphery in sealing engagement with the inner peripheral wall of said cartridge; and a piston assembly including a piston having a front face of a predetermined diametrical extent, and an elastomeric, compressible pad integrally mounted upon said front face of said piston and having a diametrical extent, under non-compressed conditions, which is substantially equal to said diamettrical extent of said piston face so as to permit said piston and said compressible pad to be inserted within said tubular portion of said end cap, said pad being disposed within said end cap so as to sealingly define an air chamber between a front face of said pad and said dome-shaped portion of said end cap whereby loads imposed upon said dome-shaped portion of said end cap during a dispensing operation are transmitted through said air chamber onto said front face of said pad so as to axially compress and radially expand said pad beyond said predetermined diameter of said piston such that said radially expanded pad sealingly engages said end cap so as to prevent the escape of air out of said air chamber between said tubular portion of said end cap and said piston and to bias said sealing lip of said end cap into sealing engagement with said inner peripheral surface of said cartridge wall.

6. The subject matter of claim 5, wherein said tubular portion, dome-shaped portion and sealing lip of said end cap are formed as an integral unit.

7. The plunger assembly of claim 5, wherein:

said pad comprises closed-cell synthetic rubber.

8. The plunger assembly as set forth in claim 6, wherein:

said end cap is fabricated from polyethylene.

* * * * *